(No Model.)

F. E. MEYER.
MANUFACTURE AND SETTING OF TRANSPARENT AND TRANSLUCENT PRECIOUS STONES, &c.

No. 250,379. Patented Dec. 6, 1881.

Witnesses.
J. B. Thurston
Wm. H. Brown

Inventor.
Francis Ed Meyer
By his attorney
M. Randolph

UNITED STATES PATENT OFFICE.

FRANCIS ED MEYER, OF NEW YORK, N. Y.

MANUFACTURE AND SETTING OF TRANSPARENT AND TRANSLUCENT PRECIOUS STONES, &c.

SPECIFICATION forming part of Letters Patent No. 250,379, dated December 6, 1881.

Application filed September 2, 1881. (No model.)

*To all whom it may concern:*

Be it known that I, FRANCIS ED MEYER, of the city, county, and State of New York, have made certain new and useful improvements in the manufacture and setting of transparent or translucent real or imitation precious stones, composition of glass or paste, so as to enhance their brilliancy and bring out to the best advantage the wonderful refulgence or luster of the gem, semi-gem, or imitation precious stone; and I hereby declare the following to be a full and clear description of my said invention.

This invention is in the same line as and supplementary to Patents Nos. 223,237, 229,328, 233,364, and 236,608, all being for improvements in real or imitation precious stones, and is designed to carry out and economically utilize the improvements set out in the said patents.

In the patents above cited the rear side or "collet" of the transparent or translucent real or imitation precious stone or gem is coated with a reflective substance, so as to enhance the brilliancy of the same; but in the present invention I propose to make the said real or imitation stone or gem of two pieces instead of one piece, as in the former patents, and unite the two pieces, either by cement interposed between the two pieces or by the setting, the line on which the two pieces meet being preferably chosen to coincide with the acute-angle line that separates the front face or "crown" from the rear face or collet, and which said acute angle may readily be grasped by the setting-teeth, so as to hold the two parts of the said stone or gem together simply by the setting.

The said invention will be readily understood by reference to the accompanying drawings, of which—

Figure 1:
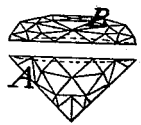
Figure 2:
Figure 3:
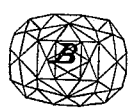
Figure 4:
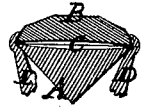

Figure 1 is a side elevation of one of the improved real or imitation precious stones, composition of glass or paste, showing the two parts thereof slightly separated at the dividing-line between them, so as to show clearly the two parts. Fig. 2 is a side elevation of the same parts shown in Fig. 1; but in this view the two parts are represented as being cemented together. Fig. 3 is a general plan of the same. Fig. 4 is a side elevation of the two parts forming this improved stone or gem, showing the said parts united by the setting which holds the said parts together, so as to make the finished piece resemble a single stone.

The two parts A and B, forming this real or imitation stone, will be composed of any transparent or translucent real or imitation precious stone, composition of glass or paste, and the said two parts will be so cut, fitted, and conformed together as to appear like one solid stone or gem when it is completed and united, as shown in Figs. 2, 3, and 4. These two parts A and B will be cut and conformed together so as to unite on a dividing-line, $c$, which said line will form the apex or salient angle usually formed to divide the front face or crown from the rear face or collet of a precious stone or gem, as is clearly shown in Figs. 1, 2, and 4. The contiguous faces of the parts A and B should be cut or faceted in a manner similar to that usually employed for cutting the front and rear faces of precious stones, and then the said contiguous faces of the said parts A and B will be coated with some highly-reflective substance, precisely as described in my aforesaid Patents Nos. 223,237, 229,328, 233,364, and 236,608. In preparing the said pieces A and B, as above described, the contiguous faces thereof may be made flat or concave, as shown by the dotted lines in Figs. 1, 2, and 4.

When the two parts A and B shall have been fully prepared, as above described, they will be united together by some adhesive substance placed between the two parts, so as to hold the two parts firmly together on the line $c$; or the two parts may be held together simply by the setting D, which is made to grasp in its hold both the piece A and the piece B, and so hold them together.

Having described my invention, I claim—

A transparent or translucent real or imitation precious stone, composition of glass or paste, formed of two parts, A and B, the adjacent faces of which are coated with some highly-reflective substance, as described, and the two parts securely fastened together, either by a firm cementing placed between them or by the setting-holds of D, substantially as described.

FRANCIS ED MEYER.

Witnesses:
M. RANDOLPH,
J. B. THURSTON.